(12) United States Patent
Nunokawa

(10) Patent No.: US 7,202,966 B2
(45) Date of Patent: Apr. 10, 2007

(54) PRINTING MEDIUM, PRINTING MEDIUM UNIT, PRINTING SYSTEM, CONSUMPTION CONTROL SERVER, CONSUMPTION CONTROL SYSTEM, AND CONSUMPTION CONTROL METHOD

(75) Inventor: Hirokazu Nunokawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 924 days.

(21) Appl. No.: 10/223,690

(22) Filed: Aug. 20, 2002

(65) Prior Publication Data

US 2003/0063315 A1    Apr. 3, 2003

(30) Foreign Application Priority Data

Aug. 24, 2001   (JP)   ............................. 2001-254841

(51) Int. Cl.
*G06F 3/12*   (2006.01)
*G06F 15/00*   (2006.01)

(52) U.S. Cl. ..................................... 358/1.15; 709/203
(58) Field of Classification Search ............... 358/1.15, 358/1.12, 1.14, 1.16; 705/14; 709/203
See application file for complete search history.

(56) References Cited

U.S. PATENT DOCUMENTS

| | | | |
|---|---|---|---|
| 6,731,393 B1* | 5/2004 | Currans et al. ............ | 358/1.12 |
| 2002/0015066 A1* | 2/2002 | Siwinski et al. .............. | 347/19 |
| 2002/0181015 A1* | 12/2002 | Whale ...................... | 358/1.15 |
| 2002/0194064 A1* | 12/2002 | Parry et al. ................... | 705/14 |
| 2003/0067504 A1* | 4/2003 | Spurr et al. ................... | 347/19 |

\* cited by examiner

*Primary Examiner*—Kimberly Williams
*Assistant Examiner*—Dillon Murphy
(74) *Attorney, Agent, or Firm*—Sughrue Mion, PLLC

(57) ABSTRACT

There are realized a printing medium, a printing-medium unit, a printing system, a consumption-amount managing server, a consumption-amount managing system, and a consumption-amount managing method, which enable effective use of media-supplier information which relates to a media supplier that supplied the printing medium and which is recorded on a memory. A printing medium comprises a memory for recording information to be read into a printing system, and media-supplier information relating to a media supplier that supplied the printing medium is recorded on the memory.

7 Claims, 15 Drawing Sheets

| ADDRESS | CONTENTS OF INFORMATION |
|---|---|
| 00H | PAPER TYPE |
| 01H | PAPER THICKNESS |
| 02H | PAPER COLOR |
| 03H | MANUFACTURING DATE |
| 04H | SUPPLIER NAME |
| 05H | SUPPLIER ADDRESS |
| 06H | SUPPLIER TELEPHONE NO., FAX NO. |
| 07H | URL OF SUPPLIER S HP |
| 08H | SUPPLIER MAIL ADDRESS |
| 09H | PRODUCT ID NUMBER |
| ⋮ | ⋮ |

COLOR-CORRECTION-PARAMETER
DATABASE 68

| PAPER TYPE | SUPPLIER | COLOR-CORRECTION PARAMETER |
|---|---|---|
| PLAIN PAPER | A CO. | 10, 25, 20, −10, ····· |
|  | B CO. | 15, 14, 19, 9, ····· |
|  | C CO. | 30, 15, 20, 5, ····· |
|  | ⋮ | ⋮ |
| SPECIAL-PURPOSE PAPER A (GLOSSY PAPER) | A CO. | ············ |
|  | D CO. | ············ |
|  | ⋮ | ⋮ |
| SPECIAL-PURPOSE PAPER B | ⋮ | ⋮ |
| ⋮ | ⋮ | ⋮ |

FIG. 12

CONSUMPTION-AMOUNT MANAGING DATABASE 70

| PAPER TYPE | SUPPLIER | CONSUMPTION AMOUNT (m) |
|---|---|---|
| PLAIN PAPER | A CO. | 115.6 |
| | B CO. | 12.3 |
| | C CO. | 3.7 |
| | ⋮ | ⋮ |
| SPECIAL-PURPOSE PAPER A (GLOSSY PAPER) | A CO. | ............ |
| | D CO. | ............ |
| | ⋮ | ⋮ |
| SPECIAL-PURPOSE PAPER B | ⋮ | ⋮ |
| ⋮ | ⋮ | ⋮ |

FIG. 14

PRINTING MEDIUM, PRINTING MEDIUM UNIT, PRINTING SYSTEM, CONSUMPTION CONTROL SERVER, CONSUMPTION CONTROL SYSTEM, AND CONSUMPTION CONTROL METHOD

BACKGROUND OF THE INVENTION

The present application claims priority upon Japanese Patent Application No. 2001-254841 filed on Aug. 24, 2001, which is herein incorporated by reference.

1. FIELD OF THE INVENTION

The present invention relates to a printing medium, a printing-medium unit, a printing system, a consumption-amount managing server, a consumption-amount managing system, and a consumption-amount managing method.

2. DESCRIPTION OF THE RELATED ART

There are patterns of supplying printing media, such as printing paper and/or films for printing, to a discrete printer such as an inkjet printer and/or a laser-beam printer, or, to a printing system having a computer connected to a computer connected to a discrete printer: a supplying pattern using, for example, cut sheets having previously been cut into predetermined sizes; and, a supplying pattern using printing-media units such as roll-paper units comprising a core and roll paper, such as printing paper, wound around the outer periphery of the core.

On the other hand, in view of the above-mentioned printing media, there are cases in which the user wishes to make an inquiry to a media supplier that supplied the printing media or to obtain information relating to the printing media for reasons such as that, as a result of printing with the printing system, the printing result is not satisfactory.

However, in such a case, if the above-mentioned printing media is being set onto the printing system, the user has to first confirm the type of printing media and the media supplier of the printing media currently being set. Further, there was an inconvenience in that the user had to search for information relating to the media supplier, such as the media supplier's address, telephone number, and facsimile number, the URL of the media supplier's HP, or the supplier's mail address, by pulling out, for example, the package or the manual for the printing media, or, by using, for example, a search engine with the printing system, and then contact the media supplier and/or obtain necessary information relating to the printing media.

Furthermore, in the above-mentioned patterns of supplying the printing media, an effective method is to: provide a memory, such as a barcode or a memory, on cut sheets themselves, the roll paper itself, an optical recording disk typified by a CD-R, or a roll-paper unit comprising roll paper; record various kinds of information on the memory; and use the information for, for example, managing the above-mentioned printing media.

As an effective method, there is a measure of recording paper-type information or the like on a memory, such as a memory, provided on a printing medium or the like, and setting a printing condition so as to comply with the printing media for every type of paper based on the paper-type information.

However, even when considering one certain type of paper, if there exist several media suppliers which supply that type of paper, the paper quality will be slightly different among every one of the media suppliers. Thus, there is a possibility of resulting in that the user cannot be provided with an easy and high-quality printing result through optimal setting of the printing condition.

Further, as for the above-mentioned effective method, there is a measure of recording paper-type information or the like on a memory provided on a printing medium or the like, and calculating and managing a consumption amount of the printing medium being consumed through printing for every type of paper based on the paper-type information.

However, even when considering one certain type of paper, if there exist several media suppliers which supply that type of paper, it is impossible to manage the printing media for every one of the media suppliers. Thus, there is a possibility of occurrence of inconvenience such as that, when placing an order for a product with the media supplier having the printing media, the stock amount of the actual product must be confirmed.

Further, since the paper quality is different among each of the media suppliers, in order to solve the problem of the user not being provided with an easy and high-quality printing result through optimal setting of the printing condition, there may be a case in which the printing system is provided with a function of setting the printing condition suitable to the printing media of each of the media suppliers. In this case, there is a possibility that a problem will arise in that a supplier of a printing device provided in the printing system will not actually start to provide such a function, on fear that there will be a drop in sales of the printing medium supplied by the supplier of the printing device provided in the printing system.

Further, in order to solve the above problem, there may be a case in which the supplier of the printing device provided in the printing system will bill the media suppliers of the printing media, instead of providing the printing system with a function of setting the printing condition suited to the printing media of each of the media suppliers. In this case, since there is lack of information to serve as a basis upon deciding the amount of fee for billing, there is a possibility that a problem will arise in that, for example, the media suppliers of the printing media will be required to pay an excessive amount of fee by the supplier of the printing device provided in the printing system.

SUMMARY OF THE INVENTION

The present invention has been contrived in view of the above problems, and an object thereof is to realize a printing medium, a printing-medium unit, a printing system, a consumption-amount managing server, a consumption-amount managing system, and a consumption-amount managing method that will enable effective usage of media-supplier information recorded on a memory and relating to the media supplier that supplied the printing media.

A main invention is a printing medium which comprises a memory for recording information to be read into a printing system and on which the printing system prints; and media-supplier information relating to a media supplier that supplied the printing medium is recorded on the memory.

Features of the present invention other than the above will become clear by the description of the present specification and the accompanying drawings.

BRIEF DESCRIPTION OF THE DRAWINGS

For a more complete understanding of the present invention and the advantages thereof, reference is to be made to the following description taken in conjunction with the accompanying drawings wherein:

FIG. 5 is a diagram showing a data arrangement in a memory cell 336 provided in the storage element 33;

FIG. 12 is an image diagram of a color-correction database 68 according to the present embodiment;

FIG. 14 is an image diagram of a consumption-amount managing database 70 according to the present embodiment.

DESCRIPTION OF THE PREFERRED EMBODIMENTS

Figure 1:
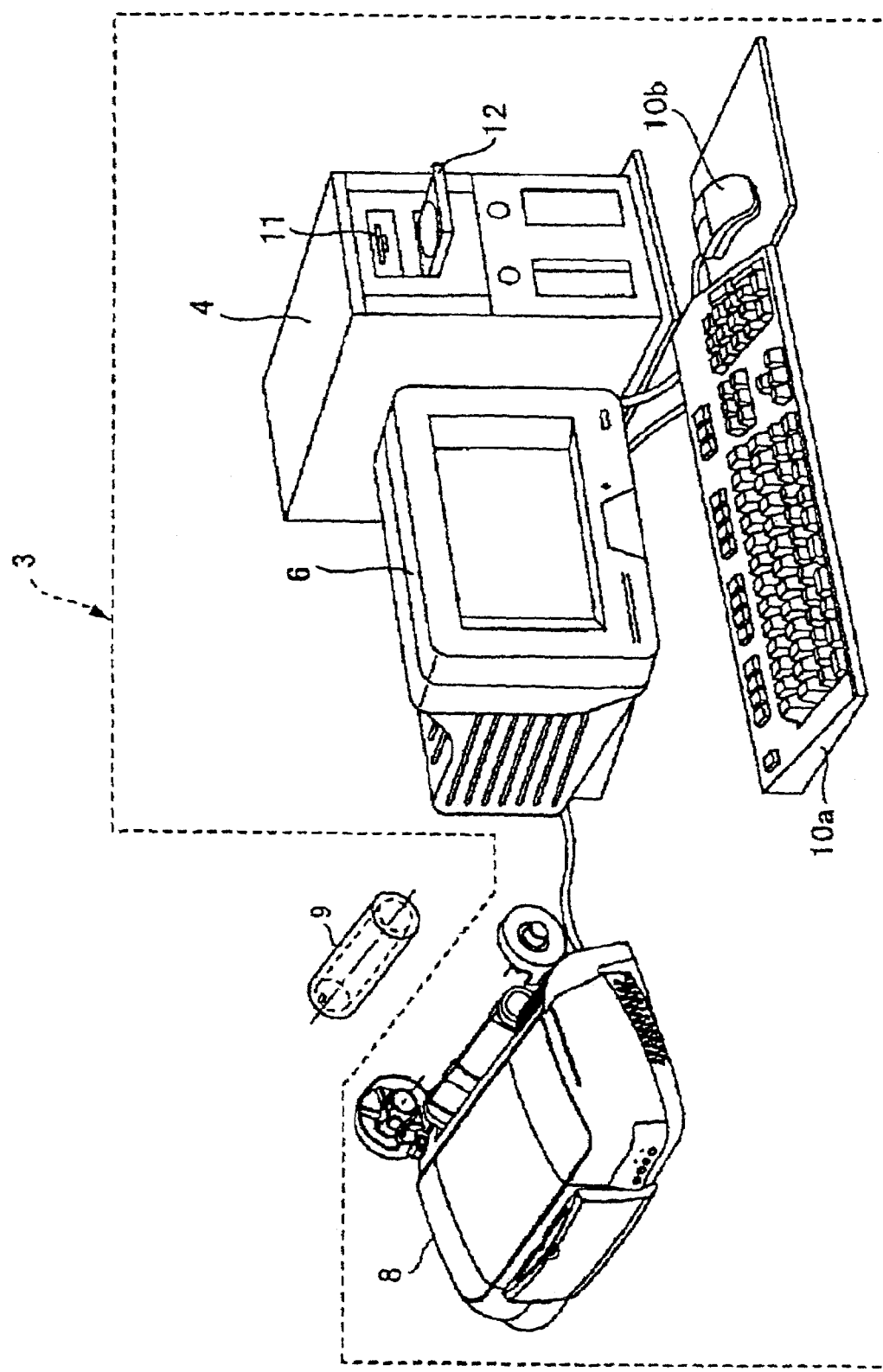
FIG. 1 is an explanatory diagram showing an outer structure of a printing system according to an embodiment.

At least the following matters will be made clear by the description of the present specification and the accompanying drawings.

A printing medium comprises a memory for recording information to be read into a printing system, wherein media-supplier information relating to a media supplier that supplied the printing medium is recorded on the memory.

The media-supplier information relating to the media supplier that supplied the above-mentioned printing medium is stored in the above-mentioned memory. Therefore, the user can easily obtain the media-supplier information of the media supplier that has supplied the printing media in use, and can efficiently enjoy support from the media supplier that has supplied the printing media. (First Effect.)

Further, ID information for individually specifying the printing medium may be recorded on the memory.

According to the above, the user can easily obtain the ID information for individually specifying the printing media, along with the media-supplier information of the media supplier having supplied the printing media in use. Therefore, the user can further efficiently enjoy support from the media supplier that has supplied the printing media. (Second Effect.)

A printing-medium unit comprises: a memory for recording information to be read into a printing system; and a printing medium to be printed on by the printing system. Media-supplier information relating to a media supplier that supplied the printing medium is recorded on the memory.

Accordingly, it becomes possible to realize a printing-medium unit that achieves a similar effect as the first effect.

Further, ID information for individually specifying the printing medium may be recorded on the memory.

Accordingly, it becomes possible to realize a printing-medium unit that achieves a similar effect as the second effect.

A printing system comprises a transmitting/receiving section for transmitting/receiving data to/from a memory provided on a printing medium or provided on a printing-medium unit comprising the printing medium. Via the transmitting/receiving section, the printing system reads-in media-supplier information which relates to a media supplier that supplied the printing medium and which is recorded on the memory.

Accordingly, it becomes possible to realize a printing system that achieves a similar effect as the first effect.

The printing system may set a printing condition corresponding to the printing medium for every media supplier based on the media-supplier information, and may print on the printing medium according to the printing condition.

Accordingly, it becomes possible for a user to easily obtain a high-quality printing result according to an optimal setting of the printing condition. (Third Effect.)

Based on the media-supplier information, the printing system may calculate a consumption amount of the printing medium consumed by printing for every media supplier.

Accordingly, a user can easily get hold of the consumption amount of the printing medium for every one of the media suppliers. Therefore, by managing the above-mentioned consumption amount, a merit in printing-medium management will arise in that, for example, the media supplier of the printing medium to whom, for example, the product should be ordered can be acknowledged at a glance when, for example, there is a shortage in stock amount of the printing medium. (Fourth Effect.)

The printing system may send out information relating to the consumption amount to a telecommunication line towards a server of a supplier of a printing device provided in the printing system.

Accordingly, the supplier of the printing device provided in the printing system can take statistics based on the information relating to the consumption amount. Further, the present supplier can, for example, bill the media supplier supplying the printing medium based on the information relating to the consumption amount for an amount of fee according to the benefit that the media supplier of the printing medium obtains as described in the above effect. (Fifth Effect.)

The printing system may send out the information relating to the consumption amount along with ID information for individually specifying the printing-medium unit.

Accordingly, the consumption amount can be related to the ID information. Thus, it becomes possible to maintain consistency among the information relating to the consumption amount obtained according to a plurality of kinds of methods including a method using the telecommunication line and methods other than this. That is, it becomes possible to avoid the defect of calculating the consumption amount twice. (Sixth Effect.)

The printing system may record the information relating to the consumption amount on a memory provided on an ink unit which is attachable/detachable to/from the printing system or a memory provided on the printing-medium unit.

Accordingly, based on the information recorded on the memory, it becomes possible to realize a printing system achieving the same effect as the fifth effect.

The printing system may record the information relating to the consumption amount along with ID information for individually specifying the printing medium or the printing-medium unit.

Accordingly, the consumption amount can be related to the ID information. Thus, it becomes possible to maintain consistency among the information relating to the consumption amount obtained according to a plurality of kinds of methods including a method of, for example, collecting the memory and methods other than this. That is, it becomes possible to avoid the defect of calculating the consumption amount twice. (Sixth Effect.)

A consumption-amount managing server in which a supplier of a printing device provided in a printing system manages a consumption amount of a printing medium consumed by printing, receives information relating to the consumption amount through a telecommunication line from the printing system which calculates the consumption amount of the printing medium for every media supplier that supplied the printing medium based on media-supplier information which relates to the media supplier and which is recorded on a memory provided on the printing medium or provided on a printing-medium unit comprising the printing medium.

Accordingly, it becomes possible to realize a consumption-amount managing server achieving the same effect as the fifth effect.

The consumption-amount managing server may receive the information relating to the consumption amount along with ID information for individually specifying the printing medium or the printing-medium unit.

Accordingly, it becomes possible to realize a consumption-amount managing server achieving the same effect as the sixth effect.

The consumption-amount managing server sends out the information relating to the consumption amount to a telecommunication line towards a server of the media supplier of the printing medium.

Accordingly, the media supplier of the printing medium can take statistics based on the information relating to the consumption amount. Further, the supplier of the printing device provided in the printing system can, for example, bill the media supplier of the printing medium in a further secure manner based on the information relating to the consumption amount for an amount of fee according to the benefit that the media supplier of the printing medium obtains as described in the above effect. Further, the media supplier of the printing medium can confirm the correctness of the above-mentioned billed amount more easily by checking the information that the media supplier has in relation to a supplied amount of the printing medium. (Seventh Effect.)

The consumption-amount managing server sends out billing information to a telecommunication line towards a server of the media supplier of the printing medium, the billing information being information for billing the media supplier of the printing medium according to the consumption amount.

Accordingly, the supplier of the printing device provided in the printing system can, for example, bill the media supplier of the printing medium in a further easier manner based on the information relating to the consumption amount for an amount of fee according to the benefit that the supplier of the printing medium obtains as described in the above effect. (Eighth Effect.)

A consumption-amount managing server in which a supplier of a printing device provided in a printing system manages a consumption amount of a printing medium consumed by printing receives information relating to the consumption amount of the printing medium. The consumption amount is:

(1) calculated by the printing system for every media supplier that supplied the printing medium based on media-supplier information which relates to the media supplier and which is recorded on a memory provided on the printing medium or provided on a printing-medium unit comprising the printing medium; and (2) recorded on a memory provided on an ink unit which is attachable/detachable to/from the printing system or a memory provided on the printing-medium unit.

Accordingly, the supplier of the printer device provided in the printing system can collect the memory. Therefore, it becomes possible to realize a consumption-amount managing server achieving the same effect as the fifth effect.

A memory to be collected by the supplier of the printing device provided in the printing system may be collected through a collection trader for collecting the memory from a user of the printing system.

Accordingly, an effect will be achieved in that some of the printing-device supplier's work to collect the memory will be reduced. (Ninth Effect.)

A consumption-amount managing server in which a media supplier of a printing medium manages a consumption amount of the printing medium consumed by printing receives information relating to the consumption amount of the printing medium from a server in which a supplier of a printing device provided in a printing system manages the consumption amount of the printing medium. The information is sent to the server through a telecommunication line from the printing system which calculates the consumption amount of the printing medium for every media supplier that supplied the printing medium based on media-supplier information which relates to the media supplier and which is recorded on a memory provided on the printing medium, or provided on a printing-medium unit comprising the printing medium.

Accordingly, it becomes possible to realize a consumption-amount managing server, in which the media supplier of the printing medium manages the consumption amount of the printing medium, achieving the same effect as the eighth effect. Further, it is also possible to realize a consumption-managing system comprising: the above-mentioned printing system; a consumption-amount managing server in which a supplier of a printing device provided in the above-mentioned printing system manages a consumption amount of the printing medium; and a consumption-amount managing server in which a media supplier of the above-mentioned printing medium manages the consumption amount of the printing medium.

It is also possible to realize a consumption-amount managing method for managing a consumption amount of a printing medium comprising the following steps: a step for a printing system to calculate the consumption amount of the printing medium for every media supplier that supplied the printing medium based on media-supplier information which relates to the media supplier and which is recorded on a memory provided on the printing medium or provided on a printing-medium unit comprising the printing medium, and send out information relating to the consumption amount to a telecommunication line towards a consumption-amount managing server of a supplier of a printing device provided in the printing system; a step for the consumption-amount managing server in which the supplier of the printing device manages the consumption amount of the printing medium to receive the information relating to the consumption amount from the printing system through the telecommunication line, and send out the information to a telecommunication line towards a server of the media supplier; and a step for the server in which the media supplier manages the consumption amount of the printing medium to receive the information relating to the consumption amount from the consumption-amount managing server through the telecommunication line.

===Schematic Structure of Printing System===

First, explanation will be made of a schematic structure of a printing system according to the present embodiment with reference to FIG. 1 and FIG. 2.

Figure 2:
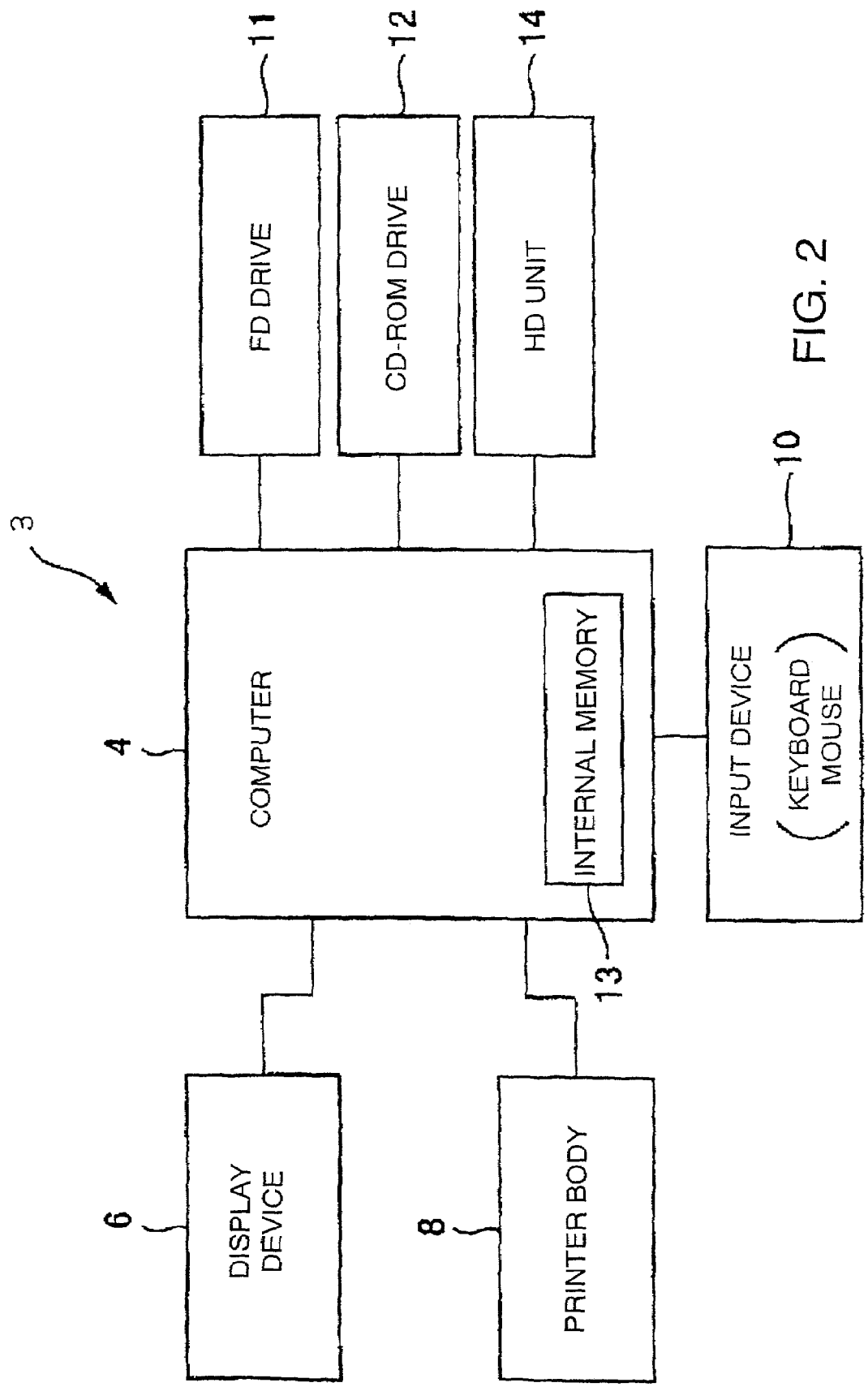
FIG. 2 is a block diagram showing a structure of the printing system shown in FIG. 1.

FIG. 1 is an explanatory diagram showing an outer structure of a printing system according to the present embodiment, and FIG. 2 is a block diagram showing a structure of the printing system shown in FIG. 1.

In FIG. 1, there are shown: a printing system 3, and a printing-medium unit 9 such as a roll-paper unit which is attachable/detachable to/from the printing system 3. Further, the above-mentioned printing system 3 comprises: a computer body 4 accommodated in an enclosure of, for example, a mini-tower type; a display device 6 such as a CRT (cathode ray tube), plasma display, or a liquid crystal display; a printer body 8 serving as a record-outputting device; a keyboard 10a and a mouse 10b serving as an input device; a flexible disk drive device 11; and a CD-ROM drive device 12.

FIG. 2 shows the structure of the printing system 3 as a block diagram. In the enclosure in which the computer body 4 is accommodated, there are further provided: an inner memory 13 such as a RAM (random access memory); and an outer memory such as a hard disk drive unit 14.

Note that in the above explanation, explanation was made of an example of structuring the computer system by connecting the printer body 8 to the computer body 4, the display device 6, the input device 10, the flexible disk drive device 12, and the CD-ROM drive device 12. However, it is possible to make the printer body 8 have some of the functions or mechanisms respectively possessed by the computer body 4, the display device 6, the input device 10, the flexible disk drive device 12, and the CD-ROM drive device 12. For example, the structure may be that the printer body 8 has an image processing section for processing an image, a displaying section for various kinds of displaying, and a recording-media attaching/detaching section for attaching/detaching a recording medium on which image data taken by, for example, a digital camera is recorded.

Further, the above-mentioned printing system 3 only needs to have a least possible structure for realizing functions for printing on a printing medium. Therefore, the above-mentioned display device 6, the keyboard 10a and the mouse 10b serving as the input device, the flexible disk drive device 11, the CD-ROM drive device 12, the inner memory 13 such as the RAM (random access memory), and the outer memory such as the hard disk drive unit 14 are not essential structural components; but the printing system 3 only needs to have the printer body 8 and the computer body 4 connected thereto, or a printer body having some of the functions of the computer body 4.

===Schematic Structure of Printer Body and Printing-Medium Unit===

Figure 3:
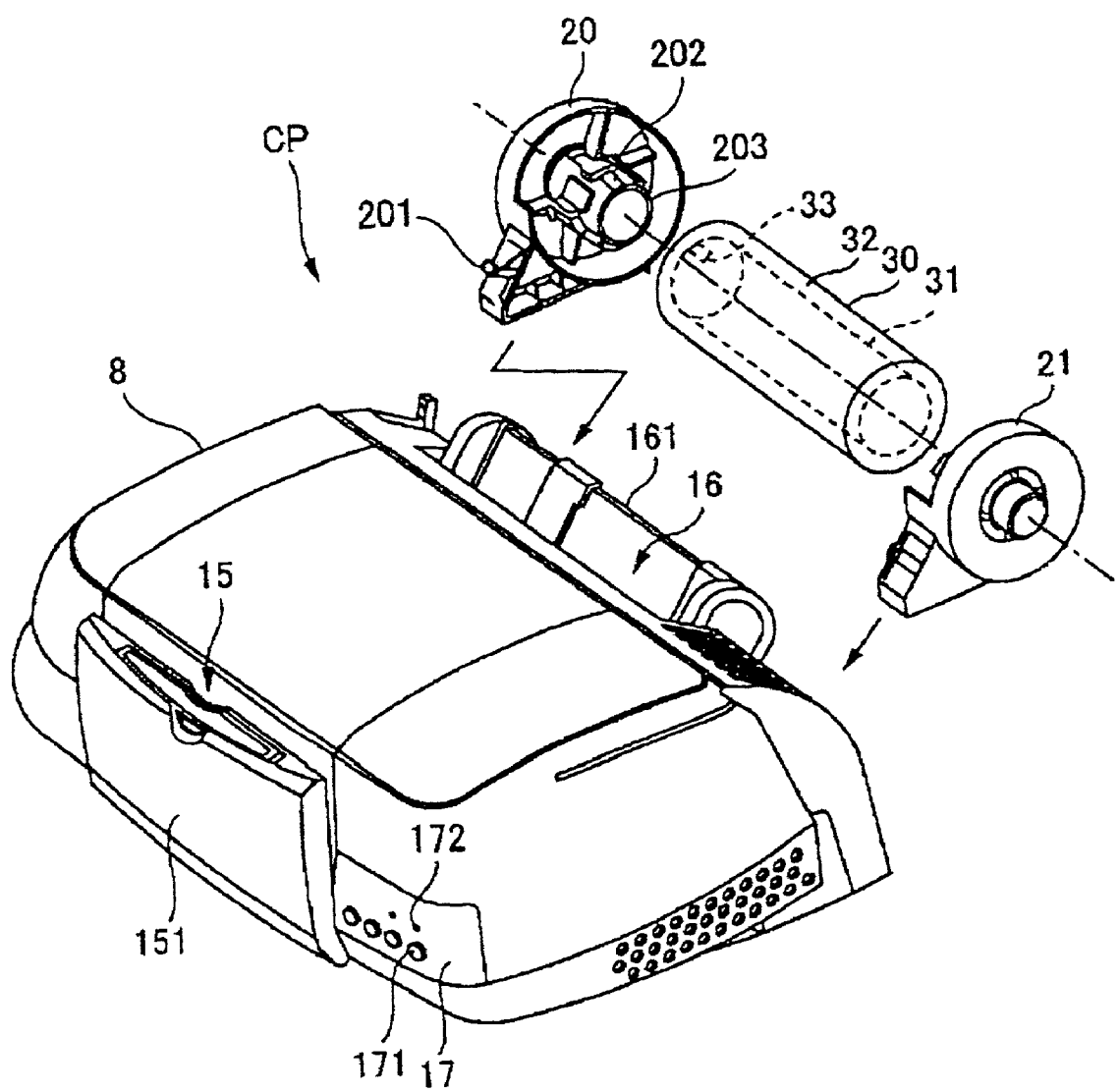
FIG. 3 is an explanatory diagram showing a color printer CP as an example of a printer having a printer body 8 and a printing-medium unit 9.

FIG. 3 shows a color printer CP as an example of a printer having a printer body 8 and a printing-medium unit 9. Further, a roll-paper unit 30 is shown as an example of the printing-medium unit 9.

The color printer CP is a printer that can output color images, and is an inkjet-type printer that forms an image by ejecting colored inks in, for example, four colors, i.e., cyan (C), magenta (M), yellow (Y), and black (K) onto a printing medium such as a roll paper and forming dots therewith. Note that, regarding the colored inks, it is possible to use light cyan (pale cyan, LC), light magenta (pale magenta, LM), and dark yellow (dim yellow, DY) other than the above-mentioned four colors.

As shown in FIG. 3, the color printer CP has a structure of discharging a printing medium, such as a printing paper, having been supplied from the back of the printer from the front side thereof. An operation panel 17 and a paper-discharging section 15 are provided on the front surface of the printer body 8; and a paper-supplying section 16 is provided on the back of the printer 8. The operation panel 17 comprises various operation buttons 171 and indicator lamps 172. The paper-discharging section 15 comprises a paper-discharging tray 151 that covers the paper-discharging port when not in use.

The paper-supplying section 16 comprises a paper-supplying holder 161 for holding cut sheets (not shown), and roll-paper-unit holders 20, 21 for holding the roll-paper unit 30.

The roll-paper unit 30 comprises: a core 31; print roll paper 32 which is wrapped around the outer periphery of the core 31; and a storage element (storage member) 33 serving as a memory and provided on the inner periphery of the core 31. The details of the storage element 33 will be described later on.

The roll-paper-unit holders 20, 21 are arranged on both sides at the back of the printer body 8 so as to form a pair. One of the roll-paper-unit holders 20, 21, the roll-paper-unit holder 20 in the present embodiment, comprises: an electrical contact point 201 with the printer body 8; and a transmitting/receiving section 202 for transmitting/receiving data to/from the storage element 33 of the roll-paper unit 30 and electrically connected to the electrical contact point 201. Note that in FIG. 3, in order to show both the contact point 201 and the transmitting/receiving section 202 provided on the roll-paper-unit holder 20, the roll-paper-unit holders 20, 21 are shown in a state detached from the printer body 8 and the roll-paper unit 30.

===Structure of Storage Element 33===

Figure 4:
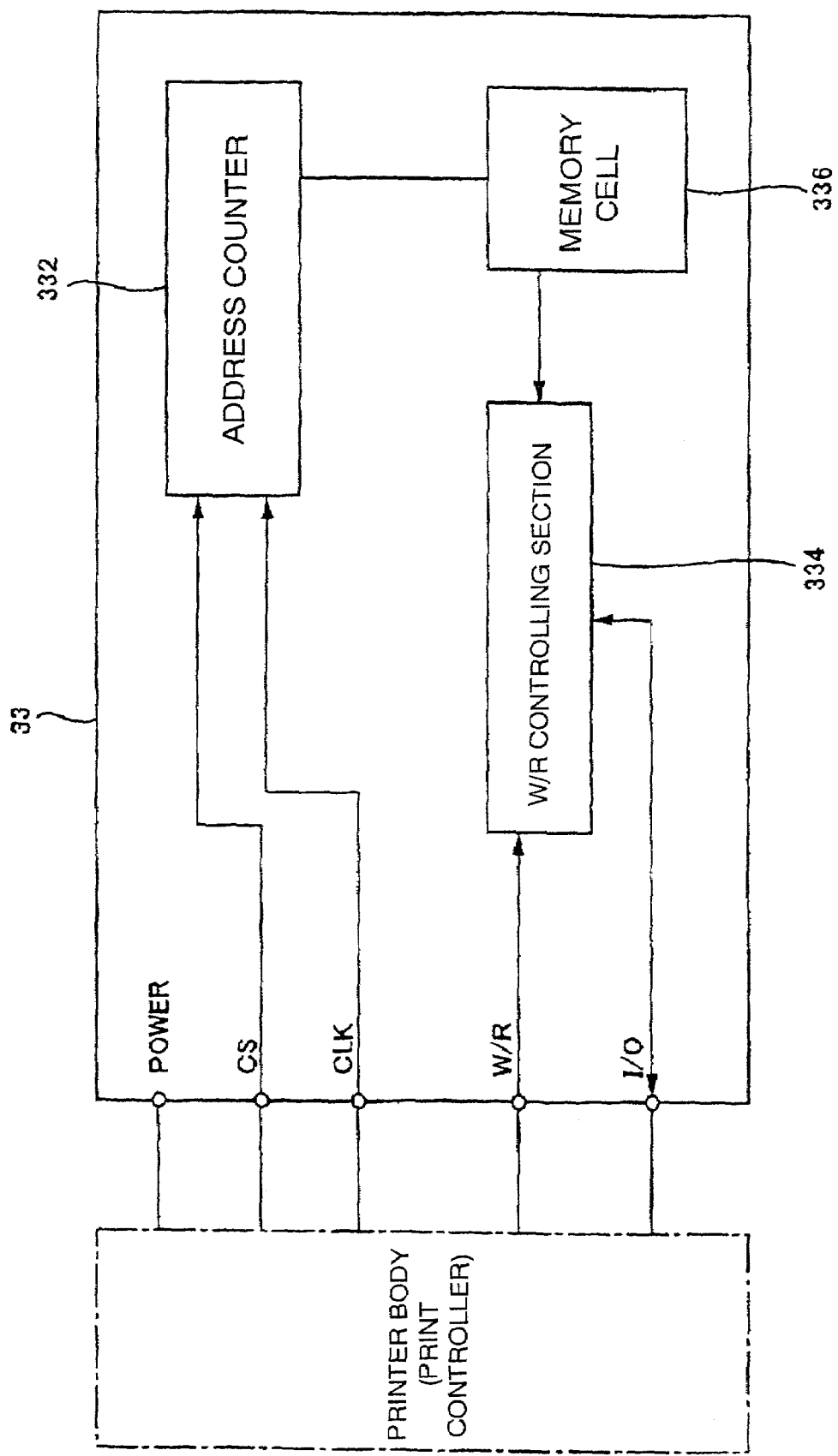
FIG. 4 is a block diagram showing the structure of a storage element 33.

Next, explanation will be made of the structure of the storage element 33 with reference to FIG. 4 and FIG. 5. FIG. 4 is a block diagram showing the structure of the storage element 33. FIG. 5 is a diagram showing data arrangement in a memory cell 336 provided in the storage element 33.

As shown in FIG. 4, the storage element 33 has: the memory cell 336; a W/R controlling section 334 for controlling reading-in and writing-in of data from/to the memory cell 336; and an address counter 332 that designates an address within the memory cell 336 according to a clock signal CLK upon reading-in or writing-in of data with the W/R controlling section 334. Note that the W/R controlling section 334 reads-in and writes-in data in serial.

As shown in FIG. 5, the memory cell 336 has a region in which data is readable and rewritable. In this region, there are stored, for example: paper-type information; paper-thickness information; paper-color information; information relating to manufacturing date; and, in addition to the above, there is stored media-supplier information relating to the media supplier that supplied the printing medium. In FIG. 5, the name of the media supplier, the address of the media supplier, the telephone number and FAX number of the media supplier, the URL of a homepage of the media supplier, and the mail address of the media supplier are shown as the above-mentioned media-supplier information. However, the media-supplier information is not limited to the above, and can be any kind of information enabling identification of the media supplier. For example, the information may be, for example, a date and time at which the media supplier's support for products can be accepted.

Further, as shown in FIG. 5, a product-ID number is stored in the memory 336 as an example of ID information for individually specifying the printing medium.

Additional explanation will be made of the respective terms shown in the areas of FIG. 5. The paper-type information is information relating to the type of paper (for example, plain paper, paper for exclusive use, or special-purpose paper such as glossy paper). The paper-thickness information is information relating to the thickness of the paper. The paper-color information is information relating to the color of the to-be-printed surface of the paper. The manufacturing-date information is information relating to the date on which the printing roll was manufactured. The supplier name is the name of the media supplier that supplied the printing medium. The supplier address is the address of the media supplier that supplied the printing medium. The supplier telephone number and FAX number is the telephone number and the FAX number of the media supplier that supplied the printing medium. The URL of the supplier's HP is the URL (Uniform Resource Locator) of the HP (homepage) of the media supplier that supplied the printing medium. The supplier mail address is the e-mail address of the media supplier that supplied the printing medium. The product-ID number is an ID number for distinguishing the individual products. Note that information other than the above-mentioned information can appropriately be stored in the areas of the memory cell 336.

Further, there are cases where the media supplier is: a manufacturer of a product; an entity that manufactures and sells a product; an entity that sells a product, without actually manufacturing the product, through OEM supply of the product from the manufacturer; and, in a broad sense, an entity that is entrusted by a certain manufacturer and provides support for their product.

Generally, the above-mentioned information is written-in before the roll-paper unit 30 is set on the printer body 8, and for example, upon manufacturing of the roll-paper unit 30 at a factory and. Further, although not shown, it is possible to store information that can be rewritten or written-in after setting the roll-paper unit 30 on the printer body 8, such as the date on which the printing medium was started to be used or the like.

Note that, as for the storage element 33, it is possible to use a noncontact-type storage element that does not require contact between the storage element 33 and the transmitting/receiving section 202 upon data transmitting/receiving, or, a contact-type storage element on the assumption that the two components will contact.

===Memory as a Substitute for Storage Element 33===

Figure 6:
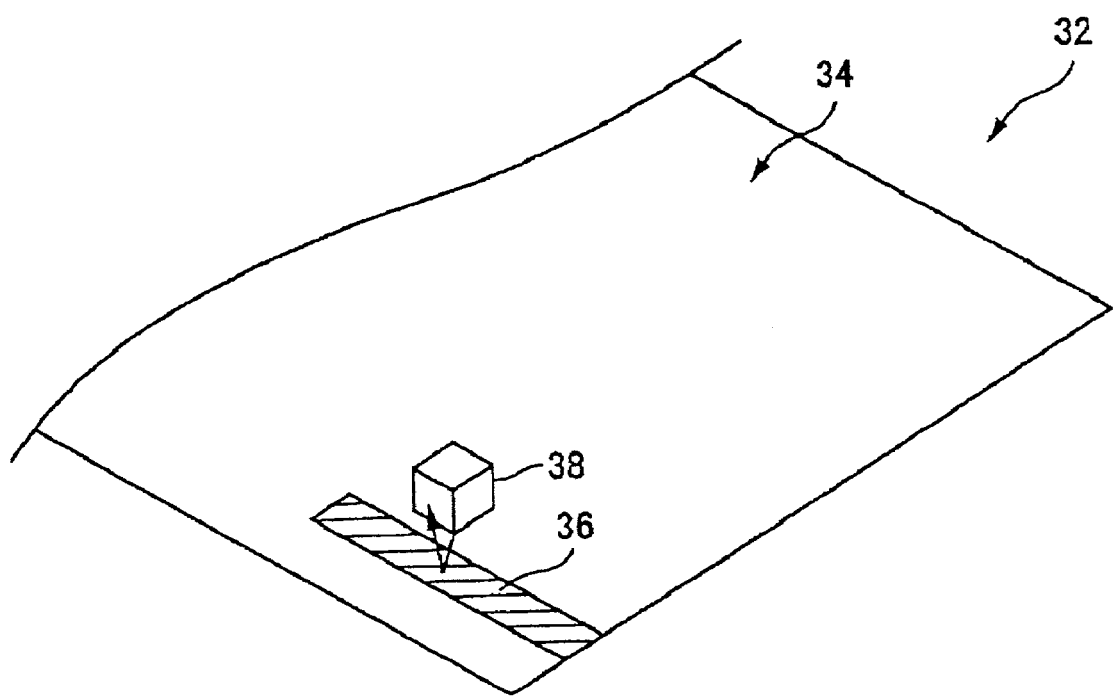
FIG. 6 is a perspective view of a roll paper 32 as an example of a printing medium according to the present embodiment.

In the above, as a memory for storing information read into the printing system 3, there was shown a storage element (storage member) 33 provided on the inner peripheral surface of the core 31 of the roll-paper unit 30. In the present section, using FIG. 6, explanation will be made of another kind of memory serving as a substitute of the storage element 33. FIG. 6 is a perspective view of a roll paper 32 as an example of a printing medium according to the present embodiment.

Similar to the above-mentioned embodiment, the roll paper 32 is wrapped around the outer periphery of the core 31 of the roll-paper unit 30. An strip-like film 36 is affixed in an attachable/detachable manner to a predetermined position at the edge on a not-printed surface 34 of the roll paper 32.

Further, on the strip-like film 36, there are recorded the various kinds of information shown in FIG. 5, that is, for example: the paper-type information; the paper-thickness information; the paper-color information; the manufacturing-date information; the supplier name; the supplier address; the supplier's telephone number and FAX number; the URL of a homepage of the supplier; and the supplier mail address. The information is recorded, for example, on the strip-like film 36 in a form like a barcode that is detectable by a detector 38 such as a barcode reader.

Note that, although the strip-like film 36 is used as a memory in the present embodiment as explained above, the memory may be made of, for example, a material other than the above-mentioned strip-like film 36, and for example, a material such as paper. Further, the various kinds of information may be recorded directly onto the roll paper 32, instead of the memory being structured to be affixed in an attachable/detachable manner. Further, the position on which the above-mentioned information is recorded does not have to be on the not-printed surface of the roll paper. Further, the position does not have to be limited to the edge.

Further, although explanation was made of the roll paper 32 taken as an example of a printing medium in the present embodiment, cut sheets and/or optical recording disks such as CD-ROMs, CD-Rs, CD-RWs, DVD-ROMs, DVD-Rs and DVD-RWs may be used instead of the roll paper 32. That is, there may be cases where the above-mentioned information is recorded on the cut sheets and/or the optical recording disks either directly or in an affixing manner.

===Inner Structure of Control Circuit of Color Printer CP===

Figure 7:
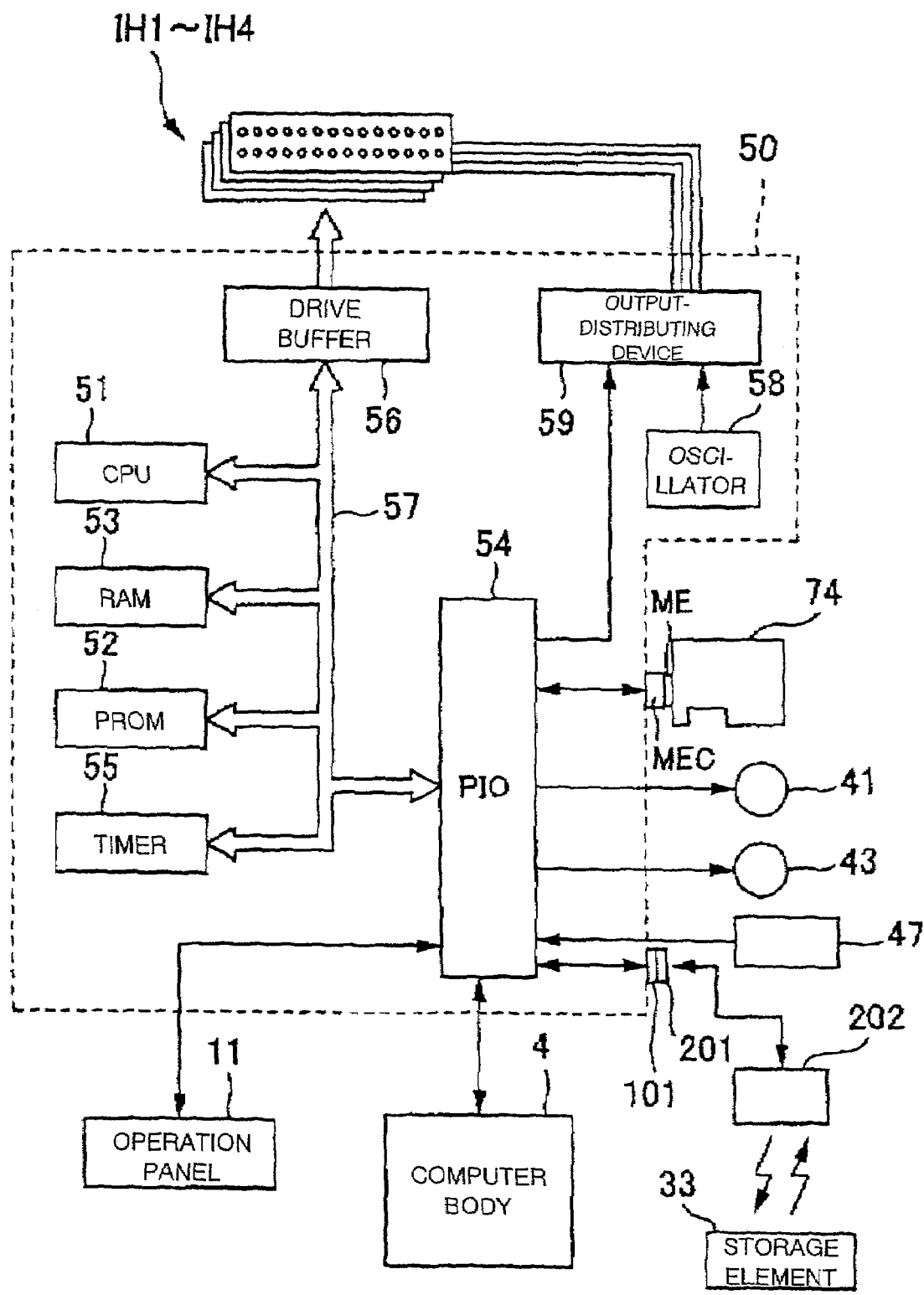
FIG. 7 is a block diagram showing the inner structure of a control circuit of the color printer CP according to the present embodiment.

Next, explanation will be made of an inner structure of a control circuit of the color printer CP with reference to FIG. 7. FIG. 7 is a block diagram showing the inner structure of the control circuit of the color printer CP according to the present embodiment.

As shown in the figure, inside the control circuit 50 there are provided, for example: a CPU 51; a PROM 52; a RAM 53; an input/output section for peripheral equipments (PIO) 54; a timer 55; and a drive buffer 56.

To the PIO 54, there are connected: the computer body 4; a contact point MEC for a memory element ME of an ink unit; a carriage motor 41; a paper-feed motor 43; an encoder 47; and the transmitting/receiving section 202 via contact points 101 and 202. The drive buffer 56 is used as a buffer for feeding, to ink-ejecting heads IH1 through IH4, on/off signals for forming dots. The above components are connected to each other via a bus 57, and are made so that data can mutually be exchanged. Further, the control circuit 50 comprises: an oscillator 58 that outputs a drive waveform at a predetermined frequency; and an output distributing device 59 that distributes the output from the oscillator 58 to the ink-ejecting heads IH1 through IH4 at predetermined timings.

The control circuit 50 accesses the storage element 33 provided on the core 31 of the roll-paper unit 30 via the transmitting/receiving section 202. The control circuit 50 either controls a printing process in accordance with the information obtained from the storage element 33, or sends the information to the computer body 4 so as to make a printer driver provided in the computer body 4 to process the information. Further, the control circuit 50 receives print data from the printer driver provided in the computer body 4, and, in synchronism with movement of the paper-feed motor 43 and/or the carriage motor 42, outputs dot data to the drive buffer 56 at a predetermined timing.

In the above, the control circuit 50 is made to access the storage element 33 provided on the core 31 of the roll-paper unit 30 via the transmitting/receiving section 202. However, note that, the control circuit 50 may instead access a memory such as a barcode provided on the roll paper 32 via a detector such as a barcode reader.

===Structure of Computer Body 4 Relating to Printing Process===

Figure 8:
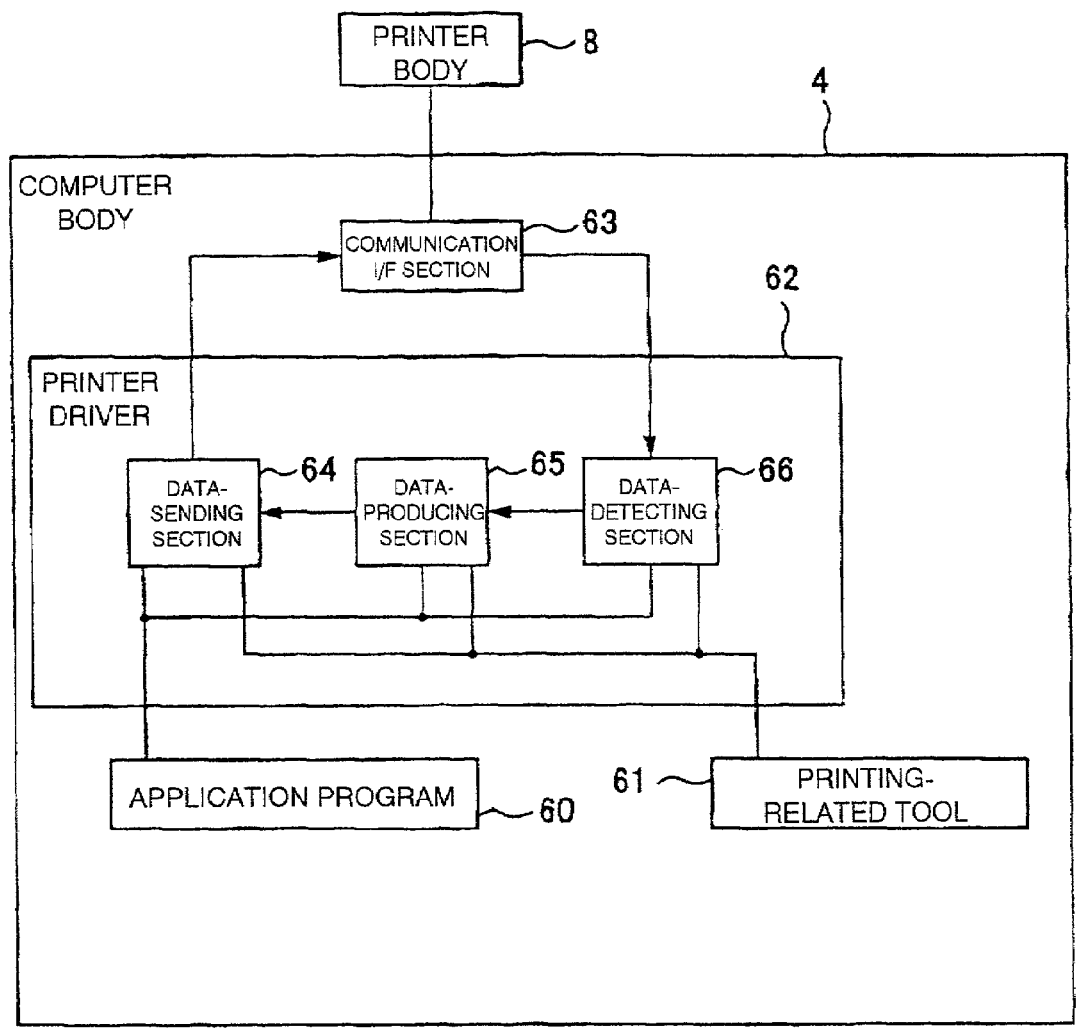
FIG. 8 is a schematic diagram showing the structure of a computer body 4 relating to a printing process.

Next, using FIG. 8, further explanation will be made of a structure, relating to a printing process, of the computer body 4 shown in FIG. 7. FIG. 8 is a schematic diagram showing the structure of the computer body 4 relating to the printing process.

The computer body 4 comprises: an application program 60; a tool 61 relating to printing; a printer driver 62; and a communication interface (hereinafter referred to as "I/F") section 63. Further, the printer driver 62 comprises: a data-sending section 64; a data-producing section 65; and a data-detecting section 66.

As examples of the application program 60, there are, for example, document-creating software, drawing software, and spreadsheets. However, the program is not limited to the above. When a user instructs printing using the application program 60, data such as a document created with the application program 60 is input to the printer driver 62. The printer driver 62 produces, in the data-producing section 65, print data based on the data transferred from the application program 60.

The printing-related tool 61 is a kind of application program provided by, for example, the supplier of the printing system 3 (and particularly preferably, the supplier of the printer body 8 provided in the printing system 3), and, for example, gives hints to the user for troubleshooting and/or carries out an optimal printing setting in a dialogical manner with the user. Basically, the input from the user is processed at the printer driver 62. The printer driver 62 encourages the user to make further inputs, and/or makes a notice of results. Here, as a matter of course, data exchange between the printer driver 62 and the printer body 8 is carried out appropriately.

The data-detecting section 66 obtains, for example, information relating to the printing medium from the printer body 8 via the communication I/F section 63. According to the information, the data-producing section 65 carries out various settings necessary for printing, and also, produces print data according to the data transferred from the application program 60. These setting data and print data are sent along with other commands to the data-sending section 64, and then transmitted to the printer body 8 from the communication I/F section 63 via communication means.

Here, the communication means may be structured in a wired manner or a wireless manner. Further, the configuration may be that several computer bodies 4 share one or several printer bodies 8.

===Operation of Printing System 3===

Figure 9:
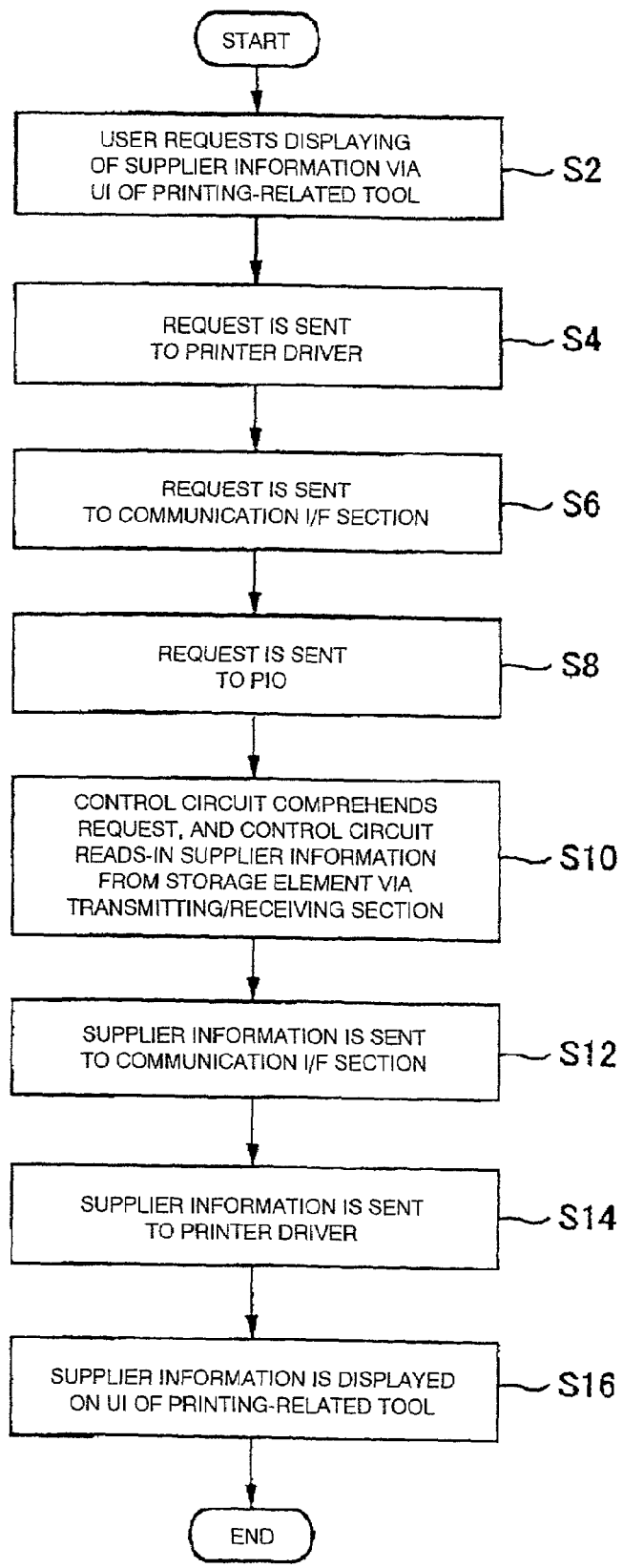
FIG. 9 is a flowchart showing the operations of the printing system 3 according to the present embodiment.
Figure 10:
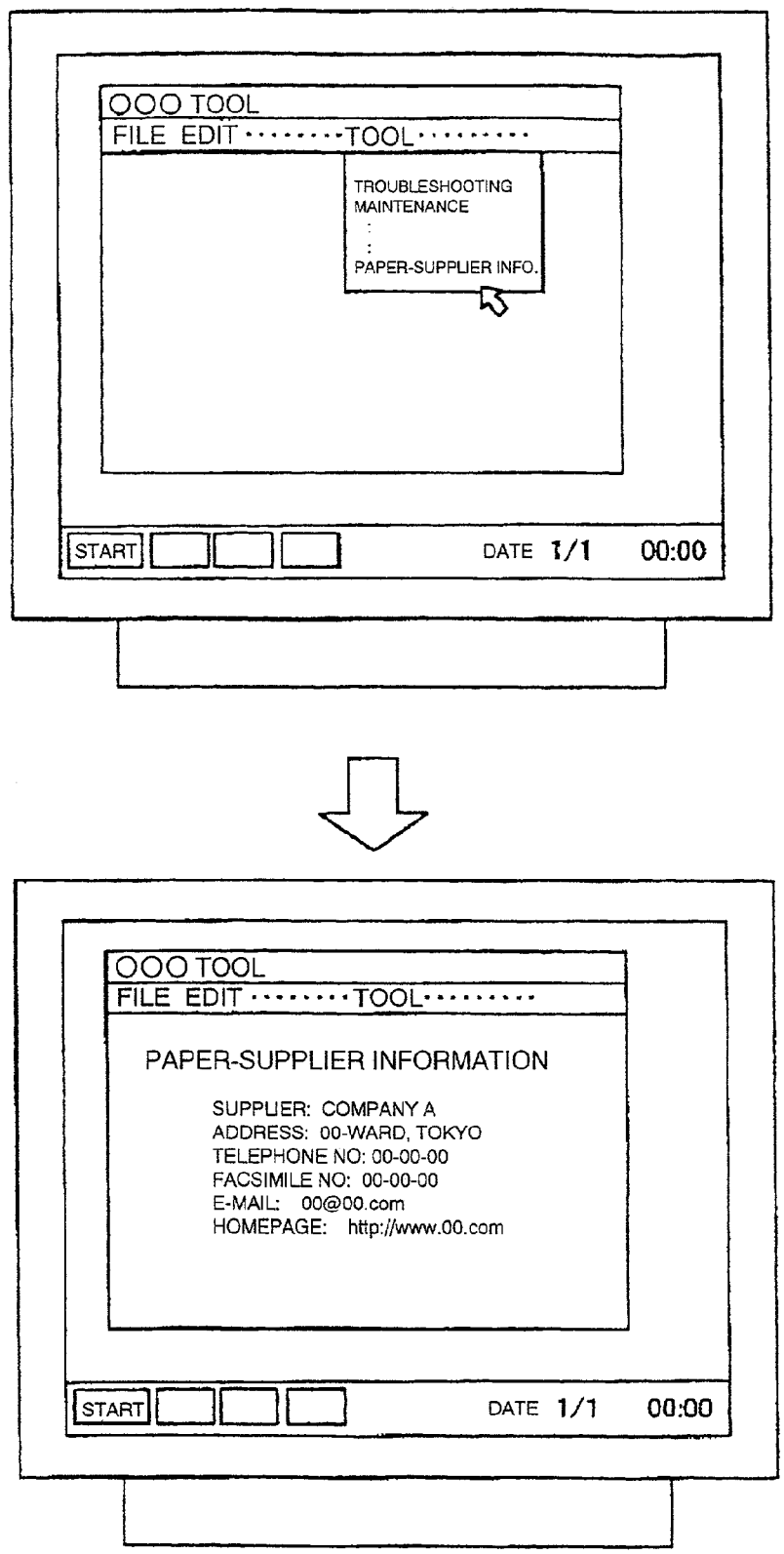
FIG. 10 is a diagram of an image of a user interface of the printing system 3 according to the present embodiment.

Next, explanation will be made of operation of the printing system 3 according to the present embodiment using FIG. 9 and FIG. 10, with reference to the figures already explained. FIG. 9 is a flowchart showing the operations of the printing system 3 according to the present embodiment. FIG. 10 is a diagram of an image of a user interface (hereinafter referred to as "UI") of the printing system 3 according to the present embodiment.

First, the user makes a request requesting for the media-supplier information relating to the media supplier that supplied the printing medium to be shown, using the UI of the printing-related tool 61 displayed on the display device 6 of the printing system 3 (step S2). As an example of the above, as shown in FIG. 10, the "paper-supplier information" section is clicked from among the menu of the printing-related tool 61 with the mouse.

The printing-related tool 61 comprehends the above request, and a request requesting to obtain the media-supplier information, relating to the media supplier that supplied the printing medium, is sent to the printer driver 62 (step S4). Further, this request is sent via the communication I/F section 63 (step S6), and to the input/output section for peripheral equipments (PIO) 54 of the printer body 8 (step S8).

Next, the control circuit 50 comprehends the above-mentioned request; and the control circuit 50 accesses the storage element 33 via the transmitting/receiving section 202, and reads-in the above-mentioned media-supplier information from the storage element 33 (step S10). Note that the control circuit 50 may be made to access a memory, such as a barcode, provided on the roll paper 32 via a detector 38, such as a barcode reader, and to read-in the above-mentioned media-supplier information from the above memory.

Next, the read-in media-supplier information is sent by the control circuit 50 to the computer body 4. The computer body 4 first receives the above-mentioned media-supplier information at the communication I/F section 63 (step S12).

Next, the media-supplier information is sent to the printer driver 62 (step S14). Finally, the information is displayed in the UI of the printing-related tool 61 displayed on the display device 6 of the printing system 3 (step S16). For example, as shown in FIG. 1, there is displayed on the displaying screen of the printing-related tool 61 various kinds of media-supplier information such as: the supplier's name; the supplier's address; the supplier's telephone number; the supplier's FAX number; the supplier's mail address; and the URL of the supplier's homepage.

As a result of the user carrying out printing to the printing medium using the printing system, there are cases where the user would like to make an inquiry to the media supplier that supplied the printing medium, or obtain information relating to the printing medium, for reasons such as that the printing result is not satisfactory.

In such a case, thanks to the above-mentioned procedure, the user will not have to first confirm the kind of printing medium and who the media supplier is regarding the printing medium currently being set, and pull out, for example, the package or the manual for the printing media, or use, for example, a search engine with the printing system, and then contact the media supplier and/or obtain necessary information relating to the printing media, in order to make contact with the media supplier and/or obtain necessary information relating to the printing medium. Further, the user can obtain information relating to the media supplier such as the address, the telephone number and the FAX number of the media supplier, the URL of the supplier's homepage, and the supplier's mail address in a more convenient manner.

Furthermore, since the user can efficiently enjoy support from the media supplier that supplied the printing medium, the user's usage of the printing medium supplied by this media supplier will be promoted.

Further, as the number of users who want to use a printing medium of a certain media supplier increases, the user's usage of the printing system will be promoted. Such a phenomenon is significant for optical recording disks, typified by CD-Rs, in which characteristics of the product greatly differ according to the media suppliers.

Note that it is possible to record ID information for individually specifying the printing medium on the memory, read-in the information along with information relating to the media supplier, and display the information. Accordingly, the user can easily obtain the ID information for individually specifying the printing medium along with the media-supplier information of the media supplier that supplied the printing medium in use. Therefore, the user will be able to know, without delay, the above ID information upon, for example, making an inquiry to the media supplier of the printing medium, and thus, can further efficiently enjoy support from the media supplier.

Further, it is possible for a browser to be activated when the URL of the media supplier's homepage displayed in the displaying screen of the printing-related tool 61 is clicked with the mouse, and to be able to browse the media supplier's homepage. Similarly, it is possible for a mailer to be activated when the media supplier's mail address displayed in the displaying screen of the printing-related tool 61 is clicked with the mouse, and to be able to create a mail. Further, it is possible to output, for example, the read-in address and/or the FAX number to a postcard-creating software and/or a facsimile-sheet creating software, in order to facilitate creation of postcards and/or facsimile sheets.

Further, in the above-mentioned embodiment, as for the operation for displaying the media-supplier information relating to the media supplier that supplied the printing medium, there was described a situation in which the user used the mouse to click-on the section shown as the "paper-supplier information" from the menu of the printing-related tool 61 displayed on the display device 6 of the printing system 3. However, the operation is not to be limited to the above. For example, the information may be displayed on the display device 6 when the user instructs printing with, for example, a document-creating software, a drawing software, or a spreadsheet; or, the information may be displayed upon carrying out troubleshooting relating to the printing medium or upon carrying out an optimal printing setting relating to the printing medium in a dialogical manner with the user, through the use of, for example, the above-mentioned printing tool 61.

Further, in the above-mentioned embodiment, the displaying of the media-supplier information was displayed on the display device 6 of the printing system 3. However, the information may be displayed on, for example, a liquid-crystal display provided on the printer body 8.

Further, instead of displaying the media-supplier information, the information may be notified by voice.

===Second Embodiment===

Figure 11:
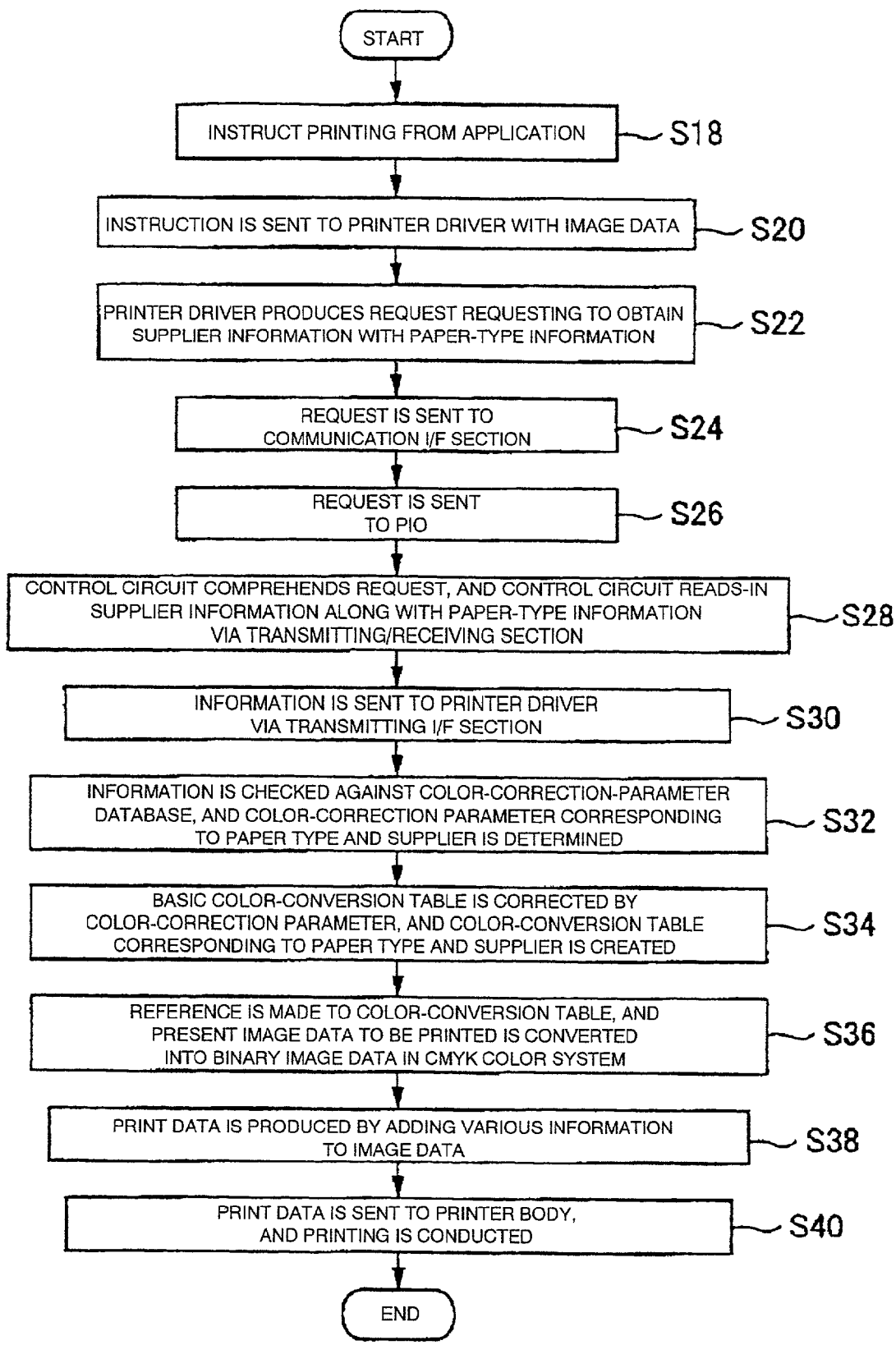
FIG. 11 is a flowchart showing operations of the printing system 3 according to the second embodiment.

Next, explanation will be made of operations of a printing system 3 according to a second embodiment using FIG. 11 and FIG. 12, and with reference to the figures already explained. FIG. 11 is a flowchart showing operations of the printing system 3 according to the second embodiment. FIG. 12 is an image diagram of a color-correction database 68 according to the present embodiment.

First, the user makes an instruction to carry out printing using arbitrary software among the application programs 60 (step S18). When the user instructs printing, the instruction is sent to the printer driver 62 along with image data created with the software (step S20).

Next, in response to the above-mentioned instruction, the printer driver 62 generates a request requesting to obtain media-supplier information relating to the media supplier that supplied the printing medium with the paper-type information of the printing medium (step S22). Then, the above request is sent via the communication I/F section 63 (step S24), and to the input/output section for peripheral equipments (PIO) 54 provided in the printer body 8 (step S26).

Next, the control circuit 50 comprehends this request. The control circuit 50 accesses the storage element 33 via the transmitting/receiving section 202, and reads-in the media-supplier information relating to the media supplier that supplied the printing medium from the storage element 33, along with the paper-type information of the printing medium (step S28). Note that the control circuit 50 may be made to access a memory, such as a barcode, provided on the roll paper 32 through a detector 38, such as a barcode reader, and to read-in the above-mentioned information from the above memory.

Next, the read-in information is sent by the control circuit 50 to the computer body 4. The computer body 4 first receives the above-mentioned information at the communication I/F section 63. Then the above-mentioned information is sent to the printer driver 62 (step S30).

Next, the printer driver 62 checks the above-mentioned information against the color-correction-parameter database 68 provided in the printer driver 62, so as to determine an optimal color-correction parameter according to the paper type and the media supplier (step S32). That is, as shown in FIG. 12, a row containing the relevant paper type and the relevant media supplier is retrieved from the database, and a value in relation to the color-correction parameter is taken out from a cell belonging to the above-mentioned row and a column of the color-correction parameter. The color-correction parameter is a parameter for correcting values recorded on a later-explained basic conversion table to values corresponding to the paper type and the media supplier. The color-correction database 68 is a database indicating optimal color-correction parameters for every paper type and every media supplier, as shown in FIG. 12.

Furthermore, the printer driver 62 creates a color-conversion table corresponding to the paper type and the media supplier by correcting the basic color-conversion table using the above-mentioned color-correction parameter which has been optimally set (step S34). The basic conversion table is, so to speak, a standard table, and is a color-conversion table to be taken as a basis for creating a color-conversion table corresponding to the paper type and the media supplier.

Furthermore, the printer driver 62 refers to the created color-conversion table corresponding to the paper type and the media supplier, and executes a color-conversion process for converting the present image data to be printed, and more specifically, the present image data which is in the RGB color system into an image data in the CMYK color system (step S36).

Furthermore, the printer driver adds various kinds of information, such as commands for specifying nozzles on the print head for ejecting ink drops, to the above-mentioned image data having been processed, and creates print data (step S38).

Then, the above print data is sent to the printer body 8 via the communication I/F section 63; and an image having an optimal image quality corresponding to the paper type and the media supplier is printed (step S40).

As described above, the user can easily obtain a high-quality printing result by adding the media-supplier information as information to be taken as a basis, setting a printing condition corresponding to the printing medium for every paper type and every media supplier, and carrying out printing on the printing medium based on the relevant printing condition, and not only by setting a printing condition corresponding to the printing medium for every paper type based on the paper-type information.

Furthermore, the media supplier of the printing medium can enjoy the benefit that the user's usage of the printing medium supplied by this media supplier will be promoted.

Further, as the number of users who want to use a printing medium of a certain media supplier increases, the user's usage of the printing system will be promoted. Such a phenomenon is significant for optical recording disks, typified by CD-Rs, in which characteristics of the product greatly differ according to the media suppliers.

Note that, although the paper-type information was shown as information, other than the media-supplier information, to be taken as a basis for determining a color-correction parameter in the present embodiment, the information is not to be limited to the above. For example, the paper-color information, machine-type information of the printer being used, and/or information for identifying the lot of the printing medium may be added to the above-mentioned information, and these can be taken as a basis for determining the color-correction parameter.

Further, the above-mentioned color-correction database 68 may be stored on a certain server so that the supplier of printing medium and/or the printing system can easily update the contents as required; and the printer driver may access the color-correction database 68 on this server through a telecommunication line, and read-in the information, whenever necessary.

Further, in addition to the above-mentioned procedure, a procedure may be provided so that the information sent to the printer driver 62 at step S30 is made to be displayed on the display device 6 of the printing system 3, and the user is prompted to confirm or change the above information.

Further, in the present embodiment, as an example of a printing condition to be set corresponding to the printing medium for every media supplier based on the media-supplier information, there was shown an example in which correcting of the color-conversion table with the color-correction parameter optimally set for every media supplier. However, the condition is not to be limited to the above. For example, the media-supplier information can be obtained along with, for example, paper-thickness information and/or paper-image-quality information from a memory provided on, for example, the printing medium; and, the force to be applied upon paper feeding and/or paper discharging, and/or, a control parameter used for controlling the paper-feed motor may be changed for every media supplier based on the above information.

===Third Embodiment===

Figure 13:
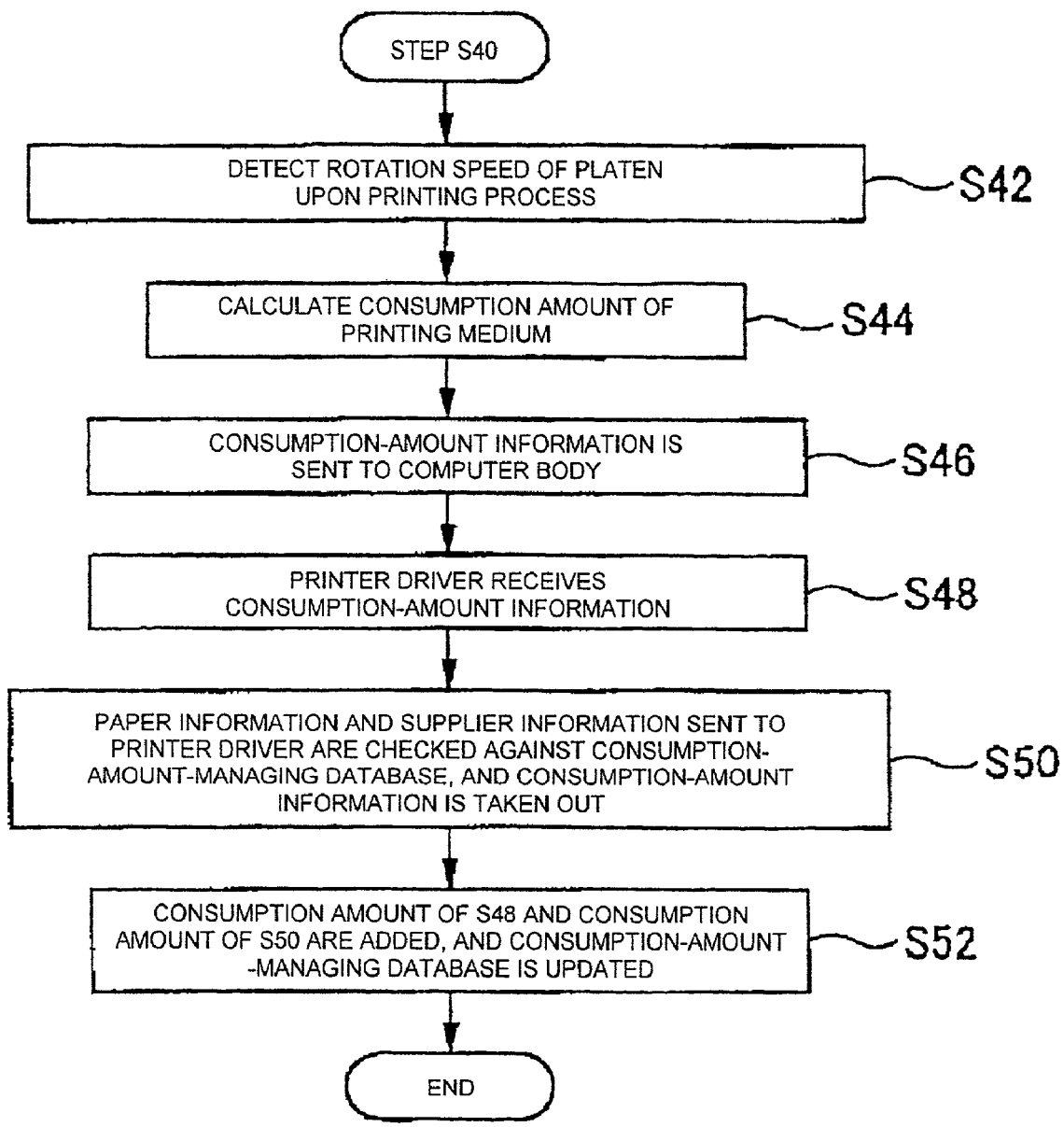
FIG. 13 is a flowchart showing operations of the printing system 3 according to the third embodiment.

Next, explanation will be made of operations of the printing system 3 according to a third embodiment using FIG. 13 and FIG. 14, and with reference to the figures already explained. FIG. 13 is a flowchart showing operations of the printing system 3 according to the third embodiment. FIG. 14 is an image diagram of a consumption-amount managing database 70 according to the present embodiment.

The present operation is started by the user making an instruction to carry out printing using arbitrary software among the application programs 60 (step S18).

The steps from when the print data is sent to the printer body 8 via the communication I/F section 63 to when an image having an optimal image quality corresponding to the paper type and the media supplier is printed (step S40) are the same as in the second embodiment. That is, the present embodiment includes the procedures shown in FIG. 13 as the first part of its flow.

Explanation will be made of procedures following step S40. Upon the printing process, the control circuit 50 detects, with the encoder, the actual angle of rotation of a platen which is made to rotate with the rotation of the paper-feed motor (step S42). Then, the control circuit 50 calculates the actual paper-feed amount, that is, a consumption amount of the printing medium according to conversion based on the above-mentioned angle of rotation (step S44).

The control circuit 50 waits for the printing to finish; and when it decides that the printing has finished, the control circuit 50 sends information relating to the above-mentioned consumption amount to the computer body 4 via the input/output section for peripheral equipments (PIO) 54 (step S46).

The above-mentioned information received at the communication I/F section 63 provided in the computer body 4 is sent to the printer driver 62 (step S48).

The paper information and the media-supplier information sent to the printer driver 62 at step S30 are checked against the consumption-amount managing database 70 which is for managing the consumption amount of the printing medium and which is provided in the printer driver 62. Accordingly, there is taken out information corresponding to the above-mentioned information and relating to a consumption amount of the printing medium before carrying out the printing process corresponding to the above-mentioned information (step S50). That is, as shown in FIG. 14, a row containing the relevant paper type and the relevant media supplier is retrieved from the database, and a value in relation to the consumption amount is taken out from a cell belonging to the above-mentioned row and a column of the consumption amount. Note that, although the unit of the consumption amount of the printing medium is in length (m) in FIG. 14, the unit is not to be limited to the above. For example, the unit may be a number of pieces of paper and/or optical recording disks.

Next, the consumption amount that the printer driver 62 received at step S48 is summed up with the consumption amount taken out at step S50, and the consumption-amount managing database 70 is updated by storing the sum as information relating to a new consumption amount (step S52), and the present process routine is completed. The contents of the consumption-amount managing database can be seen using the printing-related tool 61 in a similar manner as the manner explained in FIG. 9.

As described above, the user can easily get hold of the consumption amount of the printing medium for every media supplier by adding the media-supplier information as information to be taken as a basis, and calculating and managing the above-mentioned consumption amount for every paper type and every media supplier, and not only by calculating the consumption amount of the printing medium consumed by printing for every paper type based on the paper-type information. Therefore, there arises a merit in printing-medium management such as that the media supplier of the printing medium to whom, for example, the product should be ordered can be acknowledged at a glance when, for example, there is a shortage in stock amount of the printing medium.

Furthermore, the media supplier of the printing medium can enjoy the benefit that the user's usage of the printing medium supplied by this media supplier will be promoted.

Further, as the number of users who want to use a printing medium of a certain media supplier increases, the user's usage of the printing system will be promoted. Such a phenomenon is significant for optical recording disks, typified by CD-Rs, in which characteristics of the product greatly differ according to the media suppliers.

Note that although the present embodiment includes the procedure of correcting the color-conversion table with the color-conversion parameter optimally set for every media supplier, this procedure does not necessarily have to be included.

Further, in the above, the angle of rotation of the platen is detected by an encoder and the consumption amount of the printing medium is calculated according to conversion based on the angle of rotation upon carrying out the printing process. However, the consumption amount of the printing medium can be calculated according to conversion based on a data amount of print data sent to the printer body at step S40. In this case, updating of the consumption-amount managing database 70 can carried out before printing.

Further, the step of checking the paper information and the media-supplier information sent to the printer driver 62 against the consumption-amount managing database 70 and taking out the consumption-amount information (step S50) can be carried out after the above-mentioned information is sent to the printer driver 62 via the communication I/F section (step S30), and in parallel with the following steps (step S32 through step S48).

Further, in the above, the consumption-amount managing database 70 on which information relating to the consumption amount is recorded was provided in the printer driver in the computer body. However, the configuration is not limited to the above. The consumption-amount managing database 70 can be provided in the printer body and, for example, in the PROM 52.

Further, in addition to the above-mentioned procedures, there can be provided a procedure of inputting information relating to a stock amount of the printing medium and making the printing system 3 record the above information. Further, there can be provided a procedure for making a notice to the user by, for example, voice or displaying on the display if the difference between the calculated consumption amount of the printing medium and the above-mentioned stock amount exceeds a certain amount which can be, for example, designated by the user.

Further, as in the second embodiment, the information to be a basis of the consumption-amount calculation is not limited to the media-supplier information or the paper-type information. Furthermore, a procedure may be provided so that the information sent to the printer driver 62 at step S30 is made to be displayed on the display device 6 of the printing system 3, and the user is prompted to confirm or change the above information.

===Consumption-amount Managing System===

Next, as another embodiment, explanation will be made of a consumption-amount managing system including the printing system of the third embodiment using FIG. 15 and with reference to the figures already explained.

Figure 15:
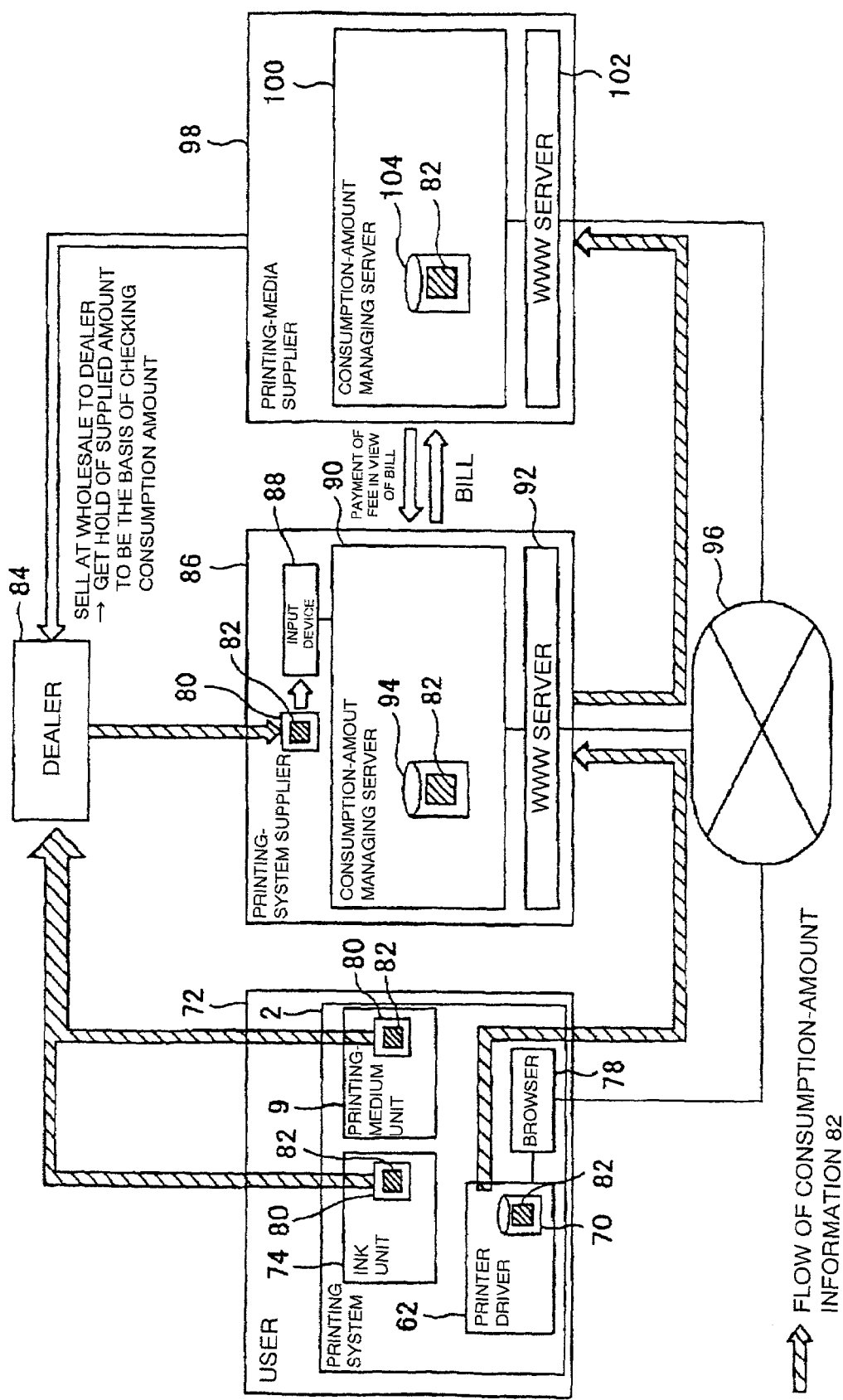
FIG. 15 is a schematic diagram showing the consumption-amount managing system.

In FIG. 15, the consumption-amount managing system comprises: the printing system 3 for the user 72; a consumption-amount managing server 90 with which a printing-system supplier 86 (and particularly preferably, the supplier of the printing device provided in the printing system) manages the consumption amount of the printing medium consumed by printing carried out by the user 72; a consumption-amount managing server 100 with which a media supplier 98 of the printing medium manages the consumption amount of the printing medium consumed by printing carried out by the user 72; and a dealer 84 that handles, for example, the printing system 3 and/or parts therefor.

First, attention should be paid to the printing system 3 of the user 72. As explained in the third embodiment, consumption-amount information 82 relating to the consumption amount of the printing medium can be managed and accumulated in the consumption-amount managing database 70 provided in the printer driver 62 of the printing system 72.

On the other hand, the printing system 3 comprises a browser 78 which is application software for, for example, connecting to the Internet. The user 72 can browse a homepage of the printing-system supplier 86.

The homepage has descriptions and functions for prompting the user 72 to send the consumption-amount information 82 to the printing-system supplier 86. As an example of the above-mentioned description, it is possible to exemplify a message such as "There is accumulated consumption-amount information. Please upload the information, if you may." Further, as an example of the above-mentioned function, it is possible to exemplify a function of, for example, sending the consumption-amount information 82 to the server of the printing-system supplier 86 by clicking on, for example, the above message with the mouse. Further, in order to prompt the user 72 to send the consumption-amount information 82, it is effective to take measures such as to provide prizes by a lottery to the users 72 who carried out sending.

Accordingly, the consumption-amount information 82 that has been sent to the server of the printing-system supplier 86 through the telecommunication line 96 by the user 72 is sent to the consumption-amount managing server 90 of the printer-system supplier 86 through the telecommunication line 96 and interfaces, and via a WWW server 92 having functions such as displaying homepages. Then, the consumption-amount information 82 can be managed and accumulated in the consumption-amount managing database 94 provided in the consumption-amount managing server 90.

Then, with the consumption-amount managing server 90 that has received the above-mentioned consumption-amount information 82, the printing-system supplier 86 can manage the consumption amount of the printing medium consumed by printing carried out by the user 72.

As explained above, by sending the consumption-amount information 82 to the server of the printing-system supplier 86 through the telecommunication line 96, there will arise merits such as that: the consumption-amount information 82 from a plurality of users 72 will be gathered to the printing-system supplier 86; various statistics can be taken based on the information; and the statistics can be reflected to future business policies.

Further, the printing-system supplier 86 can bill the media supplier 98 of the printing medium based on the information relating to the above-mentioned consumption amount for an amount of fee according to the above-explained benefit that the media supplier of the printing medium obtains (for example, the benefit obtained by the media supplier 98 of the printing medium in that the usage of the printing medium by the user 72 is promoted because the printing condition is set so as to correspond to the printing medium for every paper type and every media supplier, and because optimal printing can be carried out for the printing medium according to the above printing condition.)

Again, attention should be paid to the printing system 3 of the user 72. In the third embodiment, the consumption-amount managing database 70 is provided in the printer driver 62 of the printing system 72, and the consumption-amount information 82 relating to the consumption amount of the printing medium is managed and accumulated therein. However, here, the contents of the consumption-amount managing database 70, that is, the consumption-amount information 82 is to be recorded on a memory 80 provided on an ink unit 74 made attachable/detachable in view of the printing system 3, or on a memory 80 provided on a printing-medium unit 76.

Then, the printing-system supplier (the supplier of the printing device provided in the printing system) 86 collects the ink unit 74 or the printing-medium unit 9 comprising the memory 80.

Further, the printing-system supplier (the supplier of the printing device provided in the printing system) 86 takes the memory 80 off from the ink unit 74 or the printing-medium unit 9, and takes-in the consumption-amount information 82 into the consumption-amount managing server 90 using an input device 88 for reading-in the consumption-amount information 82 from the memory 80. Then, the consumption-amount information 82 can be managed and accumulated in the consumption-amount managing database 94 provided in the consumption-amount managing server 90.

Accordingly, with the consumption-amount managing server 90 that receives the above-mentioned consumption-amount information 82, the printing-system supplier 86 can manage the consumption amount of the printing medium consumed by printing carried out by the user 72.

According to the above, there can be obtained the same effect as the effect relating to the previously-mentioned embodiments in which the consumption-amount information 82 is sent to the server of the printing-system supplier 86 through the telecommunication line 96.

Note that collecting of the ink unit 74 or the printing-medium unit 9 can be carried out through a collection trader, such as the dealer 84, that collects the above-mentioned memory 80 from the user 72.

Accordingly, it is possible to obtain an effect that a part of the printer-system supplier's work for collecting the above-mentioned memory is reduced.

Further, the printing-system supplier 86 can collect only the memory 80 instead of collecting the ink unit 74 or the printing-medium unit 9 respectively comprising the memory 80 through, for example, the dealer 84. Further, the dealer 84 may collect the ink unit 74 or the printing-medium unit 9, and then, the printing-system supplier 86 may collect only the memory 80.

Further, in the above, the consumption-amount information 82 was taken into the consumption-amount managing server 90 using the input device 88 for reading-in the consumption-amount information 82 from the memory 80. However, it is possible to take-in the consumption-amount information 82 to the consumption-amount managing server 90 by once displaying the consumption-amount information 82 provided in the memory 80, and making, for example, an operator input the contents thereof.

Further, in the above-mentioned embodiment, the consumption-amount information 82 may be sent to the printing-system supplier 86 through the telecommunication line 96 along with ID information for individually specifying the printing medium or the printing-medium unit, or may be recorded on the memory 80 provided either on the ink unit 74 or the printing-medium unit 9 along with the ID information and be gathered to the printing-system supplier 86.

Accordingly, since the ID information can be related to the consumption amount, it becomes possible to maintain consistency among the information relating to the consumption amount obtained according to a plurality of kinds of methods including the method using the telecommunication line and the method of collecting the memory or the like. That is, it becomes possible to avoid the defect of calculating the consumption amount twice.

Next, the consumption-amount information 82 received by the printing-system supplier 86 is sent to the server of the media supplier 98 of the printing medium through the telecommunication line 96. Sending of the information is carried out between the WWW server 92 of the printing-system supplier 86 and a WWW server 102 of the media supplier 98 of the printing medium; the configuration may be that the printing-system supplier 86 uploads the consumption-amount information 82, or the configuration may be that the media supplier 98 of the printing medium downloads the information. Further, the printing-system supplier 86 may access a homepage of the media supplier 98 of the printing medium provided in the WWW server 102 through a not-shown browser provided in the WWW server 92, and carry out uploading in the same way as already explained above; or the media supplier 98 of the printing medium may access a homepage of the printing-system supplier 86 provided in the WWW server 92 through a not-shown browser provided in the WWW server 102, and carry out downloading.

Accordingly, the consumption-amount information 82 having been sent to the server of the media supplier 98 of the printing medium through the telecommunication line 96 is sent to the consumption-amount managing server 100 of the media supplier 98 of the printing medium via the WWW server 102. Then, the consumption-amount information 82 can be managed and accumulated in the consumption-amount managing database 104 provided in the consumption-amount managing server 100.

Then, the media supplier 98 of the printing medium can manage the consumption amount of the printing medium consumed by printing carried out by the user 72 by using the consumption-amount managing server 100 that receives the above-mentioned consumption-amount information 82.

As described above, by sending the consumption-amount information 82 to the media supplier 98 of the printing medium through the telecommunication line 96, there will arise merits such as that: the consumption-amount information 82 from a plurality of users 72 will be gathered to the media supplier 98 of the printing medium; various statistics can be taken based on the information; and the statistics can be reflected to future business policies.

Further, the printing-system supplier 86 can further securely bill the media supplier 98 of the printing medium based on the information relating to the above-mentioned consumption amount for an amount of fee according to the above-explained benefit that the media supplier 98 of the printing medium obtains (for example, the benefit obtained by the media supplier 98 of the printing medium in that the usage of the printing medium by the user 72 is promoted because the printing condition is set so as to correspond to the printing medium for every paper type and every media supplier, and because optimal printing can be carried out for the printing medium according to the above printing condition.)

Further, the media supplier 98 of the printing medium can confirm the correctness of the above-mentioned billed amount more easily by checking information that the media supplier has in relation to a supplied amount of the printing medium. Further, since the supplied amount of printing medium will not exceed the consumption amount of printing medium, if the printing-system supplier sends a bill on the assumption that the consumption amount exceeds the supplied amount, the media supplier of the printing medium can argue against such billing. Note that the media supplier 98 of the printing medium can obtain the information of the supplied amount of printing medium, which is to be the basis of the above-mentioned checking, by getting hold of the supplied amount of printing medium sold at wholesale to the dealer 84. Further, the information serving as a basis of the above-mentioned checking may also be managed and accumulated in the consumption-amount managing server 100, and software provided in the consumption-amount managing server 100 may confirm the correctness of the billed amount.

Note that the billing information for billing the media supplier of the printing medium for an amount of fee according to the consumption amount may be sent out to the telecommunication line towards the media supplier of the printing medium, and the media supplier of the printing medium may receive the above information.

Accordingly, the printing-system supplier can further easily bill the media supplier of the printing medium based on the information relating to the above-mentioned consumption amount for an amount of fee according to the benefit obtained by the media supplier of the printing medium as described in the above-mentioned effects.

According to the present embodiment, it becomes possible to realize a printing medium, a printing-medium unit, a printing system, a consumption-amount managing server, a consumption-amount managing system, and a consumption-amount managing method capable of effectively using media-supplier information which relates to a media supplier that supplied the printing medium and which is recorded on a memory.

What is claimed is:

1. A consumption-amount managing server in which a supplier of a printing device provided in a printing system manages a consumption amount of a printing medium consumed by printing,
   wherein said consumption-amount managing server
      receives information relating to said consumption amount through a telecommunication line from said printing system which calculates said consumption amount of said printing medium for every media supplier that supplied said printing medium based on media-supplier information which relates to said media supplier and which is recorded on a memory provided on said printing medium or provided on a printing-medium unit comprising said printing medium, and
      sends out said information relating to said consumption amount to a telecommunication line towards a server of said media supplier of said printing medium.

2. A consumption-amount managing server according to claim 1, wherein
   said consumption-amount managing server receives said information relating to said consumption amount along with ID information for individually specifying said printing medium or said printing-medium unit.

3. A consumption-amount managing server in which a supplier of a printing device provided in a printing system manages a consumption amount of a printing medium consumed by printing,
   wherein said consumption-amount managing server
      receives information relating to said consumption amount through a telecommunication line from said printing system which calculates said consumption amount of said printing medium for every media supplier that supplied said printing medium based on media-supplier information which relates to said media supplier and which is recorded on a memory provided on said printing medium or provided on a printing-medium unit comprising said printing medium, and
      sends out billing information to a telecommunication line towards a server of said media supplier of said printing medium, said billing information being information for billing said media supplier of said printing medium according to said consumption amount.

4. A consumption-amount managing server in which a media supplier of a printing medium manages a consumption amount of said printing medium consumed by printing, wherein
   said consumption-amount managing server receives information relating to said consumption amount of said printing medium from a server in which a supplier of a printing device provided in a printing system manages said consumption amount of said printing medium,
   said information being sent to said server through a telecommunication line from said printing system which calculates said consumption amount of said printing medium for every media supplier that supplied said printing medium based on media-supplier information which relates to said media supplier and which is recorded on a memory provided on said printing medium, or provided on a printing-medium unit comprising said printing medium.

5. A consumption-amount managing server according to claim 4, wherein
   said consumption-amount managing server receives billing information from said server, said billing information being information for billing said media supplier of said printing medium according to said consumption amount.

6. A print managing system comprising:
   a printing system for
      calculating a consumption amount of a printing medium for every media supplier that supplied said printing medium based on media-supplier information which relates to said media supplier and which is recorded on a memory provided on said printing medium or provided on a printing-medium unit comprising said printing medium, and
      sending out information relating to said consumption amount to a telecommunication line towards a consumption-amount managing server of a supplier of a printing device provided in said printing system;
   said consumption-amount managing server in which said supplier of said printing device manages said consumption amount of said printing medium, said consumption-amount managing server receiving said information relating to said consumption amount from said printing system through said telecommunication line, and sending out said information to a telecommunication line towards a server of said media supplier; and said server in which said media supplier manages said consumption amount of said printing medium, said server receiving said information relating to said consumption amount from said consumption-amount managing server through said telecommunication line.

7. A consumption-amount managing method for managing a consumption amount of a printing medium comprising:

a step for a printing system to calculate said consumption amount of said printing medium for every media supplier that supplied said printing medium based on media-supplier information which relates to said media supplier and which is recorded on a memory provided on said printing medium or provided on a printing-medium unit comprising said printing medium, and send out information relating to said consumption amount to a telecommunication line towards a consumption-amount managing server of a supplier of a printing device provided in said printing system;

a step for said consumption-amount managing server in which said supplier of said printing device manages said consumption amount of said printing medium to receive said information relating to said consumption amount from said printing system through said telecommunication line, and send out said information to a telecommunication line towards a server of said media supplier; and a step for said server in which said media supplier manages said consumption amount of said printing medium to receive said information relating to said consumption amount from said consumption-amount managing server through said telecommunication line.

* * * * *